S. A. WELLS.
TOOL FOR REMOVING WHEELS, ETC., FROM THEIR AXLES.
APPLICATION FILED DEC. 15, 1920.

1,412,324.

Patented Apr. 11, 1922.

WITNESSES
Guy M Spring
B. F. Garney

Inventor
SAMUEL A. WELLS

By Richard B Owen
Attorney

UNITED STATES PATENT OFFICE.

SAMUEL A. WELLS, OF LA GRANDE, OREGON.

TOOL FOR REMOVING WHEELS, ETC., FROM THEIR AXLES.

1,412,324.  Specification of Letters Patent.  Patented Apr. 11, 1922.

Application filed December 15, 1920. Serial No. 430,889.

*To all whom it may concern:*

Be it known that I, SAMUEL A. WELLS, a citizen of the United States, residing at La Grande, in the county of Union and State of Oregon, have invented certain new and useful Improvements in Tools for Removing Wheels, Etc., from Their Axles, of which the following is a specification.

This invention consists of a tool for removing wheels, etc., from their axles, the primary object being to provide a simple portable device which may be quickly attached to the screw threaded end of the shaft to exert pressure on the latter.

Another object of the invention is to provide a tool of this character which will be effective in its operation and which will not strip the threads of the shaft or axle, nor in any way mutilate said axle or the hub of the wheel, propeller, or other device mounted upon the axle or shaft.

The above and other objects of this invention will be in part described and in part understood from the following description of the present preferred embodiment of the invention taken in connection with the accompanying drawings, wherein.

Figure 1:
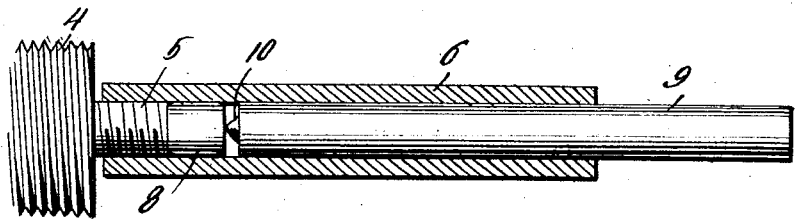
Fig. 1, is a longitudinal sectional view of the device constructed in accordance with my invention illustrating its application.
Figure 2:
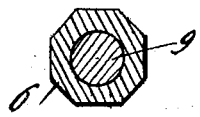
Fig. 2, is a cross-sectional view of the same.

In the drawings, in order to illustrate the application of the invention the threaded end 4 of a vehicle wheel hub is shown which has extending therefrom the threaded shank of a shaft or axle as indicated at 5.

Figure 3:
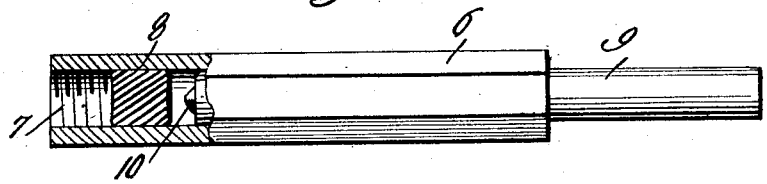
Fig. 3, is an elevational view thereof, a part being broken away to disclose details.

The device of my invention consists of a tubular casing or housing 6, which is of a hexagonal configuration as shown in Fig. 3, although any other desired shape may be used. The casing has a bore extending throughout its entire length, one end 7 of which is screw threaded for engagement with the screw threaded end of the axle 5. A lead pellet 8 is mounted in the casing preferably at the inner end of the screw thread 7 so as to snugly engage the outer terminal of the axle 5, as shown to advantage in Fig. 1. Mounted for longitudinal movement in the bore of the casing 6 is a plunger 9 preferably of a cylindrical configuration, the inner end of which is provided with a pointed nose 10, which is engageable with the pellet 8. It will be observed that the plunger 9 is relatively longer than the casing 6, whereby one end of the plunger will always project beyond the casing.

In using this device, the casing 6 is threaded onto the axle 5 as shown in Fig. 1. The plunger 9 is then driven into engagement with the pellet 8, causing movement of said axle in an obvious manner. By providing a pellet of lead it is apparent that a cushion is provided for the axle to prevent mutilation of the latter. Moreover, by slidably mounting the plunger 9 in the casing 6, stripping of the threads will be prevented. It is to be understood that this device may be used for removing wheels from axles, gears from shafts, or in any analogous capacity where difficulty of this character is experienced. By making the casing 6 hexagonal, the latter can be more firmly gripped by the hand or by a wrench, if necessary, for threading the casing on the axle. By providing the pointed nose indicated at 10 the latter will imbed itself into the lead pellet to make use of the plunger more effective.

What is claimed is:

1. A device for removing wheels from axles consisting of a casing for engagement with the axle and equipped with a cushion member for engagement with the axle and means movable through said casing and engageable with said cushion for exerting pressure on the latter to move the axle.

2. A device for removing objects from axles or shafts consisting of a casing engageable with the axle or shaft and equipped with cushioning means, and a plunger movably mounted in said casing and engageable with said cushioning means substantially as described.

3. A device as specified including a tubular casing having screw threads in one end thereof, a lead pellet arranged in said casing in proximity to said screw threads, and a plunger movable in the casing and engageable with said pellet.

In testimony whereof I affix my signature in presence of two witnesses.

SAMUEL A. WELLS.

Witnesses:
J. R. OLIVER,
C. E. BOLLMAN.